No. 856,402. PATENTED JUNE 11, 1907.
R. HELD.
SAFETY FLOAT FOR SHIPS.
APPLICATION FILED AUG. 30, 1906.

WITNESSES:

INVENTOR.
Robert Held
BY
ATTORNEY.

UNITED STATES PATENT OFFICE.

ROBERT HELD, OF ST. LOUIS, MISSOURI.

SAFETY-FLOAT FOR SHIPS.

No. 856,402.  Specification of Letters Patent.  Patented June 11, 1907.

Application filed August 30, 1906. Serial No. 332,614.

*To all whom it may concern:*

Be it known that I, ROBERT HELD, a citizen of the United States, residing at St. Louis, State of Missouri, have invented certain new and useful Improvements in Safety-Floats for Ships, of which the following is a full, clear, and exact description, reference being had to the accompanying drawings, forming a part hereof.

My invention has relation to improvements in safety floats for ships, and it consists in the novel construction of float more fully set forth in the specification and pointed out in the claims.

Figure 1:
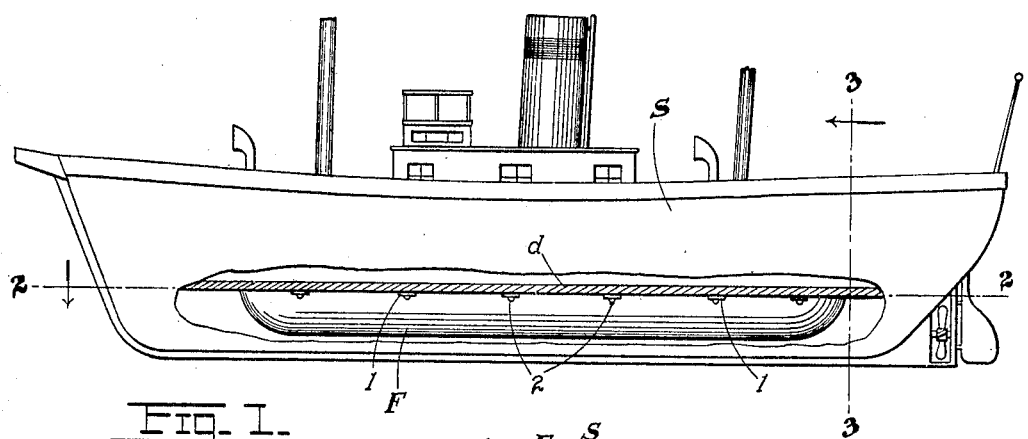
Figure 2:
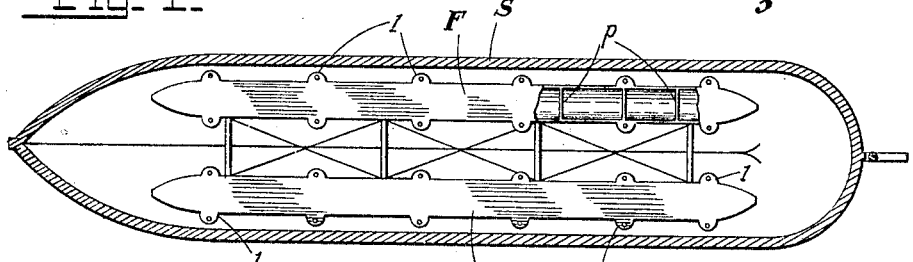
Figure 3:
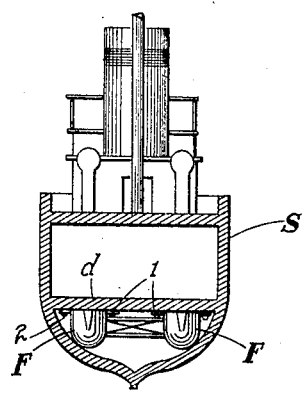

In the drawings, Figure 1 is a side elevation of a ship showing my invention applied thereto; Fig. 2 is a horizontal section on line 2—2 of Fig. 1 the top of one of the floats being partly broken away to show the partitions thereof; and Fig. 3 is a vertical cross section on line 3—3 of Fig. 1.

The object of my invention is to provide ships and vessels, particularly craft constructed of wood, with independent air-tight vessels or floats, and preferably interposed between the keel and the lower deck, which, in the event the ship springs a leak will keep the ship afloat. The floats are preferably divided by partitions into a series of independent air-tight compartments, so that in the event the walls of one or more of such compartments are punctured and filled with water, sufficient buoyancy will still remain in the float to keep the ship from sinking.

The advantages of the invention will be better apparent from a detailed description thereof which is as follows:

Referring to the drawings, S, represents a conventional form of ship or vessel. Between the lower deck $d$ thereof and keel on each side of the longitudinal center of the vessel is interposed a float F constructed out of boiler plate or other suitable material, the length and cubic capacity of the combined floats being sufficient to impart the necessary buoyancy thereto to keep the vessel afloat should the latter fill with water. Preferably, the float F is divided into a series of air-tight compartments by partitions $p$, so that in the event of puncture of any one or two of them, the remaining compartments will still possess sufficient buoyancy to keep the vessel afloat.

The float is provided with a series of lugs 1 through which are passed bolts 2 which secure the floats to the lower deck, the floats being additionally suitably braced and tied by means of braces and tie rods as shown, or by any equivalent and approved method of engineering construction.

It will be seen from the foregoing that the floats F act in the nature of floating barges which, disposed on each side of the vessel S will keep the latter afloat under all conditions. These floats are independent of the vessel proper and must not be confounded with the prevailing air-tight compartments forming constructive features in vessels of steel and iron.

The shape and details of the floats can of course be varied without in any wise affecting the nature or spirit of my invention.

Having described my invention, what I claim is:

In combination with a ship, suitable vertically disposed floats interposed and occupying the vertical space between the keel and lower deck thereof on each side of the vessel, means for securing the floats to the lower deck, and means located below the lower deck for bracing and mechanically connecting the floats against shifting or displacement, substantially as set forth.

In testimony whereof I affix my signature, in presence of two witnesses.

ROBERT HELD.

Witnesses:
EMIL STAREK,
MARY D. WHITCOMB.